United States Patent [19]

Jahier et al.

[11] Patent Number: 5,525,980
[45] Date of Patent: Jun. 11, 1996

[54] METHOD AND APPARATUS FOR OPERATING A CAPACITIVE TACTILE KEYBOARD

[75] Inventors: Isabelle Jahier, Paris; Patrick Robert, Sartrouville, both of France

[73] Assignee: Sextant Avionique, France

[21] Appl. No.: 49,345

[22] Filed: Apr. 21, 1993

[30] Foreign Application Priority Data

Apr. 24, 1992 [FR] France ............... 92-05088

[51] Int. Cl.$^6$ ............... H03K 17/94; H03M 11/00
[52] U.S. Cl. ............... 341/33; 341/22; 341/34
[58] Field of Search ............... 341/20, 22, 24, 341/26, 33, 34; 345/173, 174; 200/600

[56] References Cited

U.S. PATENT DOCUMENTS

| | | | |
|---|---|---|---|
| 4,211,915 | 7/1980 | Miller et al. ............... | 341/33 |
| 4,441,097 | 4/1984 | Anderson. | |
| 4,550,221 | 10/1985 | Mabusth. | |
| 5,012,124 | 4/1991 | Hollaway ............... | 341/33 |

FOREIGN PATENT DOCUMENTS

| | | |
|---|---|---|
| 2662528 | 11/1991 | France. |
| 58-182746 | 10/1983 | Japan. |
| 2138567 | 10/1984 | United Kingdom. |

*Primary Examiner*—Edward L. Coles, Sr.
*Assistant Examiner*—Thomas D. Lee
*Attorney, Agent, or Firm*—Barnes & Thornburg

[57] ABSTRACT

A method and apparatus for determining a valid selection of a capacitance tactile keyboard as a function of a selection state and validation state of the keyboard. The selection state is determined from measured capacitive values of each key by during a first phase of a cycle. The validation state is determined from measured pressure on the keyboard, for certain key selection states only, during a second phase of the cycle.

21 Claims, 3 Drawing Sheets

METHOD AND APPARATUS FOR OPERATING A CAPACITIVE TACTILE KEYBOARD

BACKGROUND AND SUMMARY OF THE INVENTION

This invention relates to a method of apperature for operating a capacitive tactile keyboard and, more particularly, to such a process wherein the position of the operator's finger on the keyboard and the pressure exerted by that finger are determined cyclically by measuring capacitance and pressure.

Such tactile keyboards are composed of a capacitive tactile surface positioned in front of a display, such as a liquid crystal display, for example, and make it possible to designate a specific area of the display by using a finger. To this end, the position of the finger on the surface is determined by capacitance measurements and the finger pressure exerted on the surface is detected by means of a pressure measuring device, consisting of resistance gauges, for example.

One object of the process according to the invention is to make it possible to use the signals generated by the capacitive tactile surface and the pressure measurement device.

Another object is to provide a fully programmable parameter keyboard designed to meet the requirements of operating applications and environmental constraints.

A still further object is to provide for the adjustment of keyboard sensitivity and to compensate for drifts and interference.

To this end, the object of the invention is a device for operating a capacitive tactile keyboard wherein the position of the operator's finger on the keyboard and the pressure exerted by that finger are determined cyclically by capacitance measurements and pressure measurements, characterized in that:

during a first phase of each cycle, the capacitance value of each key on the keyboard is measured and a keyboard selection state is defined based on these measurements;

during a second phase of the cycle, for certain keyboard selection states only, the pressure measurements are taken into account to define a keyboard validation state; and a decision is made on whether a valid selection has occurred as a function of the selection state and the validation state of the keyboard.

The process according to the invention is implemented by two controllers operating in a master/slave relationship and by a decoding logic.

The first controller is associated with the capacitance measuring device. Its input parameters are analog and are composed of the capacitance measurements at each cycle for each key of the keyboard, and its output parameters consist of a positive integer characterizing the selected key and a logic parameter defining the selection state of this key.

The second controller is associated with the pressure measuring device. Its input parameter is also analog and consists of the value of the pressure measured at each cycle; and its output parameter is the logic parameter defining the validation state.

The two logic parameters of the two controllers, selection and validation, are applied at the input of the decoding logic, which generates a valid selection logic parameter at its output.

To adjust for drifts and interference due to environmental factors, means may be provided for comparing the measured capacitance and pressure values to reference values and, if all measured differences in capacitance are less than a predefined low threshold, for updating the reference values.

Consequently, as long as the measured differences in capacitance are less than the low threshold, the keyboard is considered to be idle and the differences in both the capacitance values and the pressure values are considered to be attributable to drift or interference. In this case, both reference values are modified or updated. Conversely, as soon as the difference in capacitance is greater than or equal to the aforesaid low threshold, this difference is considered to be due to actuation of the keyboard, and the corresponding reference capacitance value and reference pressure value are no longer updated.

In a particular embodiment of the process of the invention, the updated reference capacitance value is obtained by calculating a weighted average using at least the previously calculated average and the measured capacitance value, and the updated reference pressure value is the last measured pressure value.

The updated reference capacitance value is obtained by calculating a weighted average from at least the previously calculated average and the measured capacitance value and therefore depend not only on currently measured capacitance values, but also on capacitance values measured during at least one preceding cycle. By weighing the current capacitive values when calculating the reference capacitive value, sensitivity can be adjusted to compensate for drift and interference, mainly of electrical origin.

Conversely, the updated reference pressure value is the current pressure value which has just been measured. This is possible because this pressure value is not in any event updated until the measured differences in capacitance are less than the low threshold and, consequently, until the keyboard is idle. This arrangement makes it possible to overcome the load factor problem.

In one particular embodiment of the invention, the differences between the measured capacitance values and the reference capacitance values are calculated. The keyboard has at least one non-selection state, one pre-selection state, and one confirmed selection state. Also, the transitions from one state to another are determined by comparing the differences in capacitance to a low threshold and to a high threshold.

More particularly, a key may be preselected when its difference in capacitance is greater than the low threshold, and a key may be selected if it has already been preselected and its difference in capacitance is greater than the high threshold.

Measurements may also be made for sorting from among several keys that are likely to be preselected, to manage conflicts, and to compensate for inadvertently brushing against the keyboard.

More particularly, when the difference in capacitance between two keys is greater than their low threshold, it is possible to preselect only the key with the highest difference in capacitance.

Moreover, when the keyboard is in the idle state or when a key has already been preselected, the keyboard remains or returns to the non-selection state if the difference in capacitance of at least two keys is or was greater than the high threshold, respectively.

Finally, when one, and only one, non-preselected key has a difference in capacitance greater than the high threshold, and if there is already a preselected key displaying a difference in capacitance that is less than the high threshold, the first key is then substituted for the second key and becomes the preselected key.

Consequently, in the idle state, the low threshold defines the range of signal variations due to drifting and residual noise. Any signal variation above this threshold is considered to be the result of an operator action on the keyboard.

The high threshold defines the sensitivity of the keyboard, that is, the signal variation characterizing a selection. More particularly, the high threshold may be selected depending on whether the keyboard is designed to be used with a glove or without.

The keyboard validation state can be determined in the second phase, when the keyboard is in the pre-selection state or confirmed selection state.

In a particular embodiment of the invention, the difference between the measured pressure value and a reference pressure value is calculated. The keyboard has at least one non-validation state, one pre-validation state, and one confirmed validation state. Also, the transitions from one state to the other are determined by comparing the pressure difference to a predetermined threshold.

More specifically, the keyboard is in the pre-validation state when the pressure difference has been above the threshold for a number of cycles below a predetermined number, and in the confirmed validation state when the pressure difference has been above the threshold for a number of cycles equal to at least this predetermined number.

The selection of the high threshold defines the pressure required for confirming a validation, and the selection of the number of timing cycles on the validation defines the minimum duration of a selection.

Other objects, advantages and novel features of the present invention will become apparent from the following detailed description of the invention when considered in conjunction with the accompanying drawings.

DETAILED DESCRIPTION OF THE DRAWINGS

Figure 1:
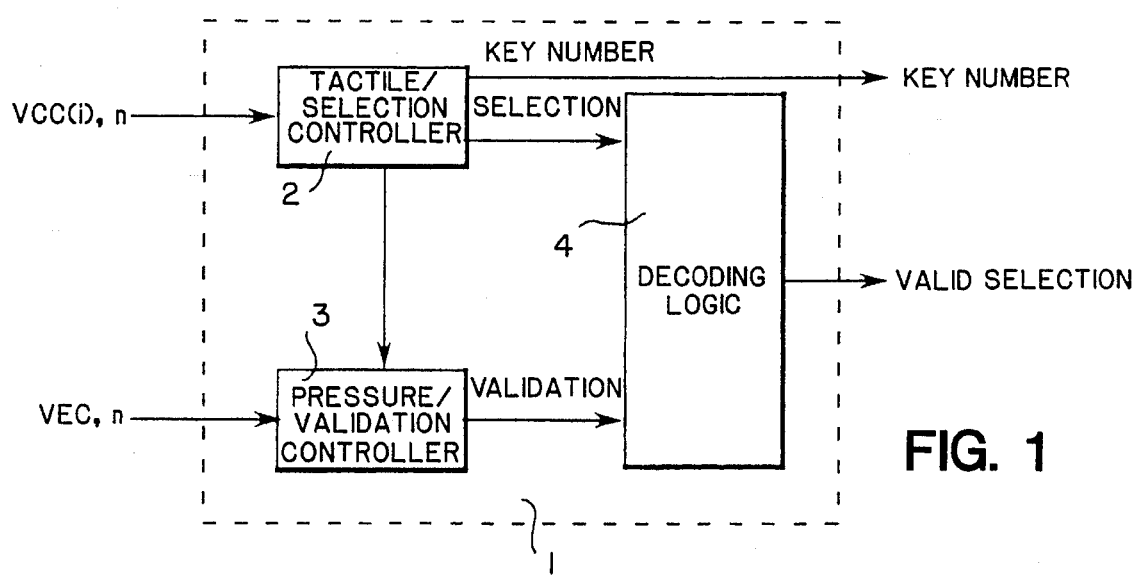
FIG. 1 is a general diagram of an apparatus capable of implementing the invention.

FIG. 1 illustrates a computer I suitable for implementing the process of the invention.

This computer consists of a selection controller 2 associated with the tactile surface, a validation controller 3 associated with the pressure measuring device, and a logic decoding unit 4. The tactile surface and its capacitance and pressure measuring devices are of a well-known type and shall not be described in further detail. The controllers 2 and 3 are also known, and only the diagrams illustrating their states and transitions shall be described in reference to FIGS. 3 and 4.

At each cycle n, the selection controller 2 receives at its input the values VCC(i), n, that is, the capacitance of keys i measured during the cycle n. The outputs of the selection controller 2 consist of a positive integer representing the number of a potentially selected key and a logic parameter defining the state of that key.

At each cycle n, the validation controller 3 receives at its input the value VEC,n of the pressure measured during that cycle n. The output of the selection controller 3 is a logic parameter defining the keyboard validation state.

The logic parameters for the selection state and the validation state are applied at the input of decoding logic unit 4, which generates the logic parameter for validated selection at its output.

The output of the computer 1 therefore consists of the number of the potentially selected key and of the following logic parameter:

VALID SELECTION=SELECTION×VALIDATION.

Moreover, it should be noted that information on the state of controller 2 is supplied to controller 3. Indeed, it will be made apparent hereinbelow that controller 3 is a slave controller of the master controller 2. A clock and other common elements of a computer have not been shown for sake of clarify.

Figure 2:
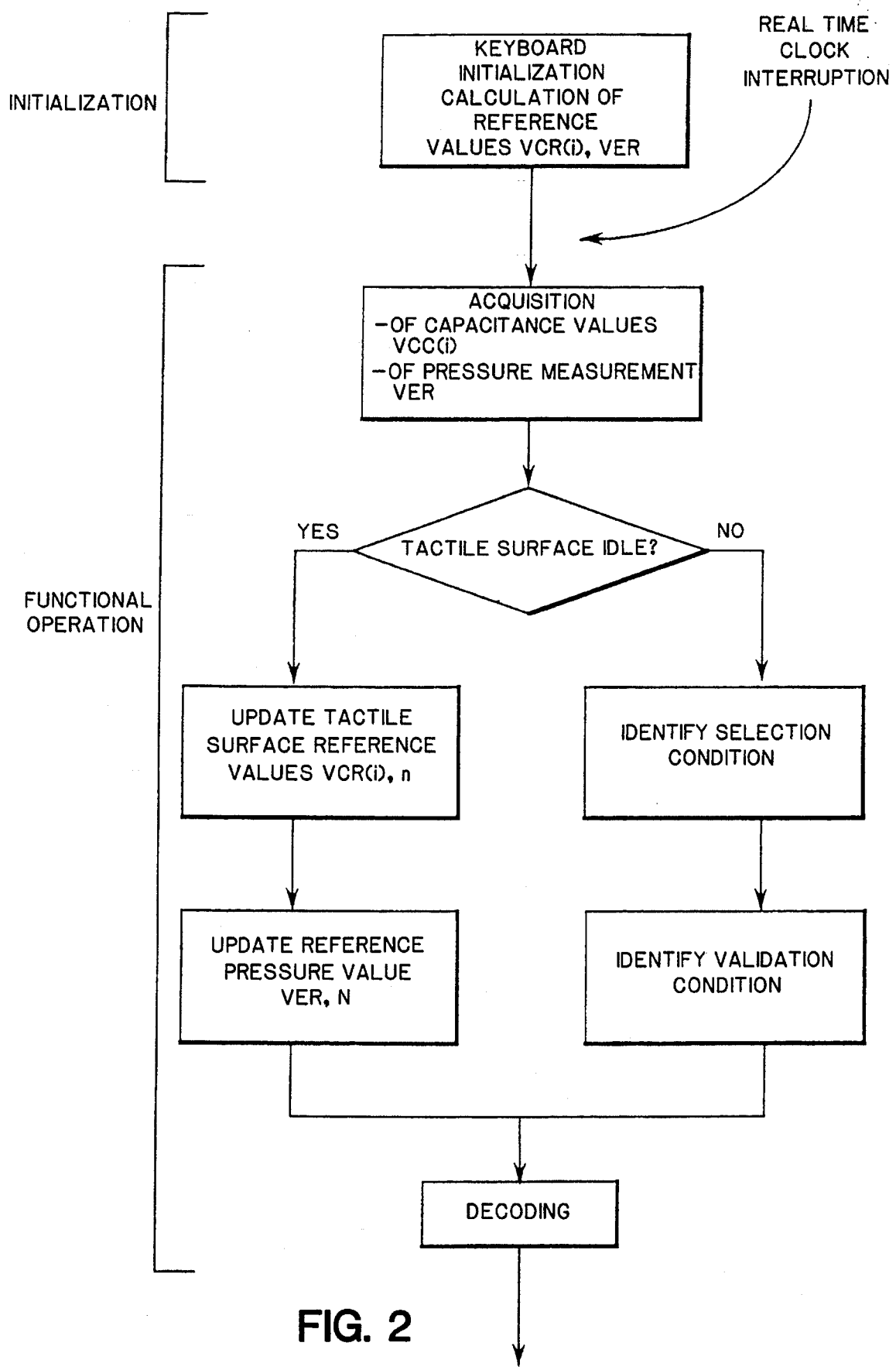
FIG. 2 is a flow chart illustrating the processing sequences according to the principles of the present invention.

Referring to FIG. 2, it is apparent that the process according to the invention is broken down into two stages, i.e., an initialization stage and a functional operating stage.

The purpose of the initialization stage is to make adjustments to compensate for inaccuracies resulting from hardware tolerances. To this end, reference capacitance values for each key VCR(i) and a reference pressure value VER are measured during the initialization stage when the keyboard is not in use, and these are stored in memory. These values constitute the initial reference values for the tactile surface and for the pressure measuring device.

The functional operating stage is initiated by an interruption initiated by a clock, for example every 20 milliseconds.

Each cycle starts acquisition of the capacitance values VCC(i) and the pressure value VEC.

A determination of whether the tactile surface is idle is then made, in the manner described hereinafter.

If the tactile surface is idle, the reference capacitance values of the tactile surface VCR(i), n and the reference pressure value VER,n are updated.

If the tactile surface is not idle, the selection condition and the validation condition are identified in succession. In this case, only the reference capacitance values of the idle keys are then updated. This is not illustrated in FIG. 2.

Finally, the cycle is completed by the decoding process described hereinabove.

The operation of the selection controller 2 shall now be described in reference to FIG. 3.

The selection controller 2 makes it possible to integrate slow signal drifts generated by the tactile surface (temperature drift), to level out residual noise, and to manage conflicts (several keys selected simultaneously).

For this purpose, the program calculates a current difference in capacitance ECC(i), n for each cycle n and for each key i, such that:

$$ECC(i),n = VCR(i),n - VCC(i),n$$

Figure 3:
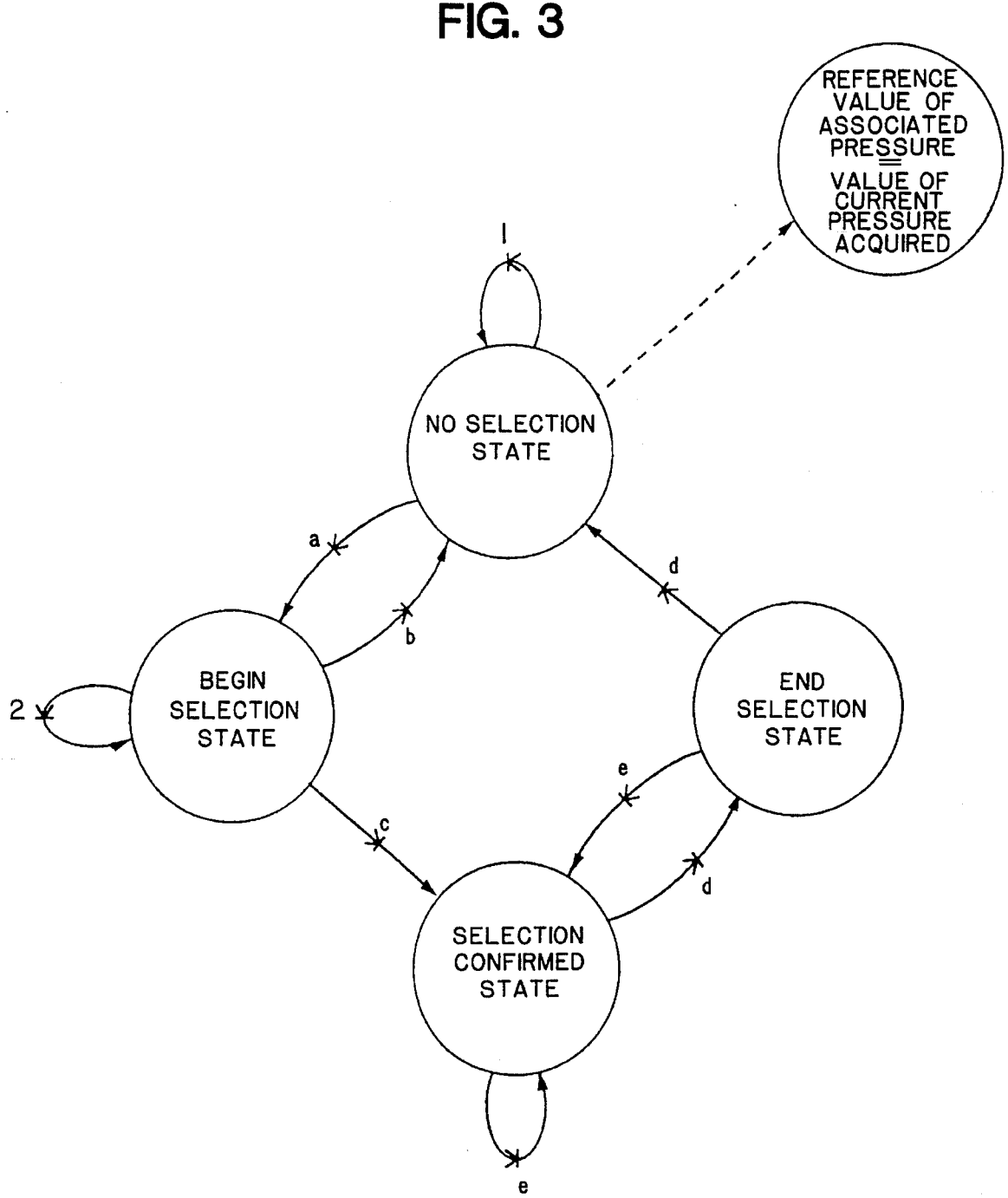
FIG. 3 represents the states and transitions of the selection controller according to the principles of the present invention.

If |ECC(i),n|<Low Threshold, the keyboard is idle and remains in the NO SELECTION state as illustrated by loop 1 in FIG. 3.

The current capacitance value of each key VCR(i),n is incorporated into the reference capacitance value VCR(i),n which is updated according to the following formula:

$$VCR(i),n = (a \times VCR(i), n-1 + VCC(i),n)/(a+1),$$

where a is a preselected weight factor. Otherwise, a selection phase begins and the controller logic is implemented.

FIG. 3 illustrates the four possible states of the selection controller 2, namely:

NO SELECTION
BEGIN SELECTION
SELECTION CONFIRMED
END SELECTION

The transitions between these states are the following:

Transition "a": At least one key i among all keys on the keyboard meets the following condition of the capacitive difference ECC(i) at cycle n:

$ECC(i),n \geq$ Low Threshold or $EEC(i),n \geq$ High Threshold and there are no two keys i and j such that:

$ECC(i),n \geq$ High Threshold and $ECC(j),n \geq$ High Threshold.

The key displaying the greatest difference is then preselected as the selected key I.

This transition "a" coincides with the detection of the proximity (case of low threshold) or the presence (case of high threshold) of a finger on the tactile surface.

During this transition "a", a check is made to ensure that only one key has been pre-selected (conflict management). The high threshold is filtered so as to ensure that the system is not overly sensitive. Consequently, at the end of this phase, only one key I is preselected and the controller shifts to the BEGIN SELECTION state. Transition "1": This transition coincides with the condition in which all the keys on the keyboard meet the following condition at cycle n:

$ECC(i)$, n<Low Threshold

As described hereinabove, this situation occurs when the keyboard is and remains in the idle state, with the controller in the NO SELECTION state. The reference values for capacitance VCR(i) and pressure VER(i) are updated.

Transition "b": This transition takes place when the previously preselected key I meets the following condition at cycle n:

$ECC(I)$, n<Low Threshold and none of the other keys on the keyboard meets the condition:

$ECC(i)$, n≥High Threshold or, if there are two keys i and j, such that $ECC(i)$, n≥High Threshold and $ECC(j)$, n≥High Threshold In the first instance, the preselected key returns to the idle state; this occurs after something has brushed against the tactile surface inadvertently, for example.

No other key is selected and the controller returns to the NO SELECTION state.

In the second case, there is a conflict, and the controller returns to the NO SELECTION state.

Transition "c": This transition coincides with the case wherein the preselected key I meets the following condition at cycle n:

$ECC(I),n \geq$ High Threshold

Key I is then selected.

In this case, the presence of the finger on key I of the tactile surface is confirmed. The controller shifts to the SELECTION CONFIRMED state.

Transition "2": If the preselected key I meets the following condition at cycle n:

Low Threshold$\leq ECC(I)$, n<High Threshold key I remains the preselected key. This occurs when the operator's finger remains in the vicinity of the key. However, the finger's effect on the key is not sufficient to confirm the selection.

The same transition takes place if the preselected key I meets the following condition at cycle n:

$ECC(I)$, n<High Threshold and if, of all other keys on the keyboard, one and only one key meets the following condition:

$ECC(i),n \geq$ High Threshold

Key i becomes the preselected key.

This case occurs when the presence of a finger is detected on a key other than the preselected key. This other key takes precedence, but the controller remains in the BEGIN SELECTION state. This makes it possible to compensate for signal interference due to the proximity of the other fingers when a selection is made on the keyboard.

Transition "d": This transition takes place when the selected key I meets the following condition at cycle n:

$ECC(I)$, n<Low Threshold

The keyboard then returns to the idle state when the key is released (the controller is in the END SELECTION state), and when this release is confirmed (the controller is in the NO SELECTION state).

Transition "e": This is the case wherein the selected key I meets the following condition at cycle n:

$ECC(I),n \geq$ Low Threshold

In this case, there is no confirmation of release and the controller returns to the SELECTION CONFIRMED state.

Consequently, the values of three parameters, that is, the low threshold, the high threshold and factor "a", which are used in the formula for updating the reference capacitance values in the operation of the selection controller 2, can be set.

The validation controller 3 shall now be described in reference to FIG. 4.

This controller lowers sensitivity to signal fluctuations induced by the load factor, the hysteresis of the test objects and drifting, and provides filtering by confirming validation over several cycles.

The validation controller 3 is a slave controller of the selection controller 2. As long as the selection controller remains in the NO SELECTION state, the reference pressure value VER at cycle n becomes the current pressure value VEC at that cycle:

$VER,n=VEC,n$

For all other states of the selection controller 2, the reference value VER is fixed:

$VER,n=VER,n-1$ and the program computes a current difference ECE,n, such that:

$$ECE,n = VEC,n - VER,n$$

The controller logic 4 is then implemented.

Figure 4:
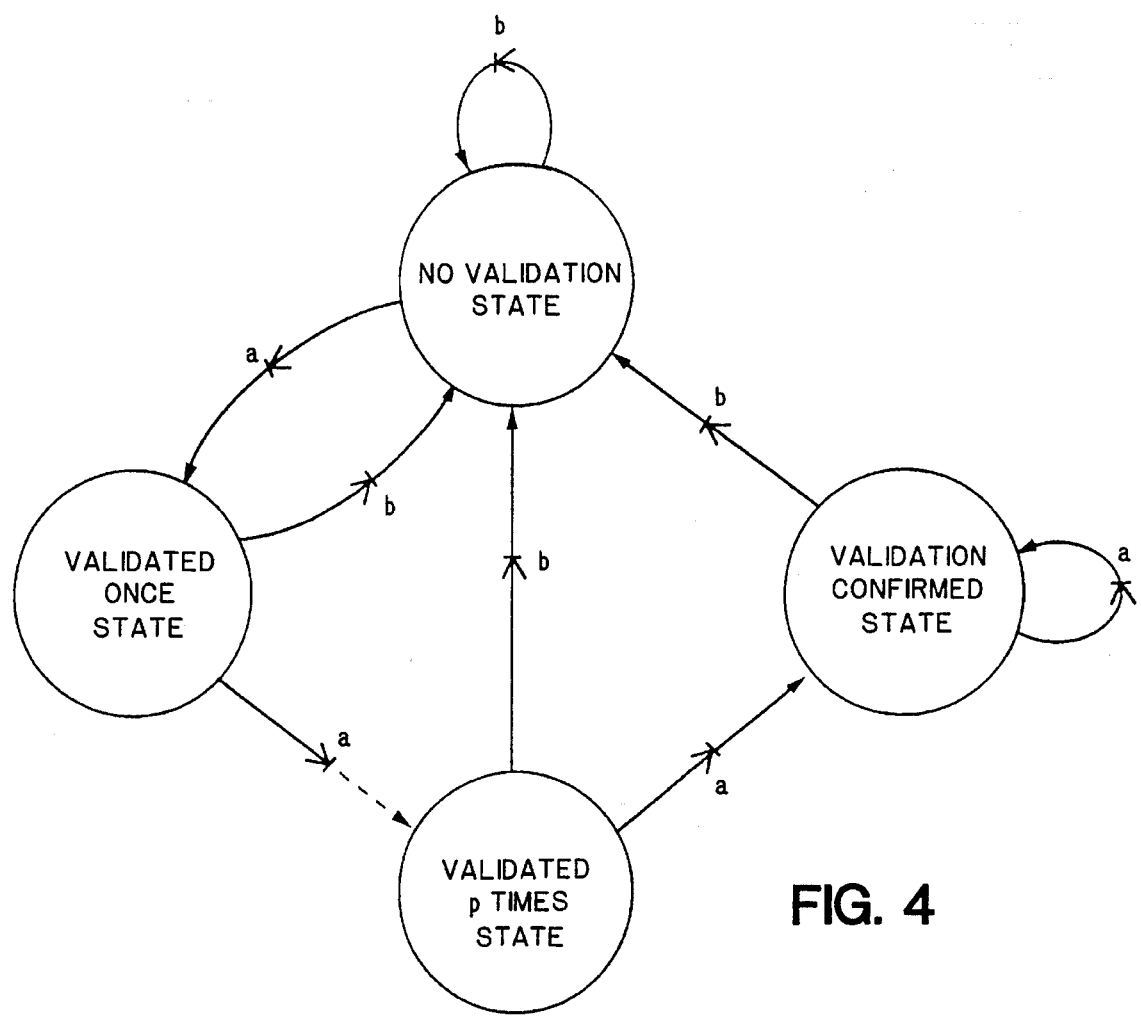
FIG. 4 illustrates the states and transitions of the validation controller according to the principles of the present invention.

FIG. 4 shows that the state number of the controller 3 is a direct function of the extent of filtration, due to the existence of the states VALIDATE ONCE, VALIDATE TWICE, ... VALIDATE p TIMES. P is set to determine the number of cycles of pressure above a preselected threshold is present to reach a VALIDATION CONFIRMED state.

The transitions of this controller are the following:

Transition "a": of this transition takes place when the following condition for the current difference in pressure ECE is met at cycle n:

$$ECE,n \geq Threshold$$

This transition occurs when enough pressure is exerted by the operator on the tactile surface to coincide with selection validation. The controller then shifts to the next VALIDATION state. After p VALIDATED states, the VALIDATION CONFIRMED state is searched.

Transition "b": This is the case wherein the following condition is met at cycle n:

$$ECE,n < Threshold$$

This is the case wherein the operator has released the pressure or has not exerted enough pressure to initiate validation. The controller 3 then returns to the NO VALIDATION state.

Consequently, it is apparent that the appropriate parameters for the threshold and number P of VALIDATION states can be programmed in the validation controller 3.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of operating a capacitive tactile keyboard, wherein the position of the operator's finger on the keyboard and the pressure exerted by that finger are determined cyclically by capacitance measurements and pressure measurements, comprising the steps of:

during a first phase of each cycle, measuring the capacitance value of each key on the keyboard and determining a keyboard selection state based on the capacitive measurement signals;

during a second phase of the cycle, for certain keyboard selection states only, measuring the pressure on the keyboard independent of said measurement during said first phase and determining a keyboard validation state based on the pressure measurement signals; and determining whether a valid selection has occurred as a function of the selection state and the validation state of the keyboard and generating a valid selection signal to be used by said keyboard.

2. A method according to claim 1 wherein determining said selection state, includes calculating the difference between each measured capacitance value and a reference capacitance value; and, when the difference in capacitance of a key is less than a predetermined low threshold, updating the corresponding reference capacitance value.

3. A method according to claim 2, wherein updating the reference capacitance values includes a computing weighted average from at least the previously computed average and the measured capacitance value.

4. A method according to claim 1 wherein determine said selection state includes calculating the difference between each measured capacitance value and a reference capacitance value; and wherein determining said validation state includes calculating the difference between the measured pressure value and a reference pressure value; and, when the differences in capacitance of all keys are less than a predetermined low threshold, updating the a reference pressure value.

5. A method according to claim 4, wherein updating the reference pressure value includes setting the reference pressure value to the last measured pressure value.

6. A method according to claim 1, wherein the keyboard has at least one non-validation state, one pre-validation state, and one confirmed validation state; and determining the keyboard validation state includes calculating the difference between the measured pressure value and a reference pressure value, and determining transitions from one state to another by comparing the pressure difference to a predetermined threshold.

7. A method according to claim 6, wherein the keyboard is determined to be in the pre-validation state when the pressure difference has been greater than the threshold for a number of cycles below a predetermined number, and in the confirmed validation state when the pressure difference has been above the threshold for a number of cycles at least equal to this number.

8. An apparatus for operating a capacitive tactile keyboard comprising:

means for measuring the capacitive value of each key on the keyboard;

means for determining a keyboard selection state based on said capacitive measurement signals;

means for measuring the pressure on the keyboard;

means for determining a keyboard validation state based on the pressure measurement signals and independent of said selection state mean;

means for operating said capacitive measuring means and said selection state means during a first phase of a cycle and for operating said pressure measuring means and validation state means for only certain selection status during a second phase of the cycle; and means for determining a valid selection as a function of the selection state and the validation state of the keyboard and generating a valid selection signal to be used by said keyboard.

9. An apparatus according to claim 8 wherein the selection state means includes means for calculating the difference between each measured capacitive value and a reference capacitive value, and means for updating the reference capacitive value when the difference in capacitance of a corresponding key is less than a predetermined threshold.

10. An apparatus according to claim 8 wherein said selection state means includes means for calculating the difference between each measured capacitive value and a reference capacitive value; and wherein said validation state means includes means for calculating the difference between the measured pressure value and a reference pressure value and means for updating the reference pressure value when the difference in capacitance of all keys are less than a predetermined threshold.

11. An apparatus according to claim 8 wherein said selection state means determines one of at least one non-selection states, one pre-selection state, and one confirmed selection state; and wherein said validation state means determines said validation states in the second phase when the keyboard is determined to be in the pre-selection state or the confirmed selection state.

12. An apparatus according to claim 8 wherein said validation state means determining one of at least one non-validation states, one pre-validation states and one confirmed validation states and determines a confirmed validation state when a predetermined number of cycles having a pre-validation state have been determined.

13. A method of operating a capacitive tactile keyboard, wherein the position of the operator's finger on the keyboard and the pressure exerted by that finger are determined cyclically by capacitance measurements and pressure measurements, comprising the steps of:

during a first phase of each cycle, a) measuring the capacitance value of each key on the keyboard, b) determining at least one non-selection keyboard selection state, one preselection keyboard selection state and one confirmed keyboard selection state based on the capacitive measurement signals calculating the differences between the measured capacitance values and reference capacitance values, and c) determining transitions from one selection state to another by comparing the differences in capacitance to a low threshold and to a high threshold;

during a second phase of the cycle, for certain keyboard selection states only, measuring the pressure on the keyboard and determining a keyboard validation state based on the pressure measurement signals; and determining whether a valid selection has occurred as a function of the selection state and the validation state of the keyboard and generating a valid selection signal to be used by said keyboard.

14. A method according to claim 13 including preselecting a key when its difference in capacitance is greater than the low threshold; and selecting a key if it has already been preselected and its difference in capacitance is greater than the high threshold.

15. A method according to claim 13, wherein preselecting only the key displaying the highest difference in capacitance when the difference in capacitance of two keys is greater than the low threshold.

16. A method according to claim 13, wherein the keyboard is determined to be in its non-selection state when the difference in capacitance of at least two keys is greater than the high threshold.

17. A method according to claim 13, including preselecting a key when its difference in capacitance is greater than the high threshold and another key is preselected, and this other key returns to its non-selection state.

18. A method according to claim 13, wherein the keyboard validation state is determined in the second phase and when the keyboard is in the pre-selection state or confirmed selection state.

19. An apparatus for operating a capacitive tactile keyboard comprising:

means for measuring the capacitive value of each key on the keyboard;

means for determining one of at least one non-selection keyboard selection states, one pre-selection keyboard selection state, and one confirmed keyboard selection state based on said capacitive measurement signals by calculating the difference between each measured capacitive value and a reference capacitive value;

means determining the transition from one selection state to another by comparing the difference in capacitance to a low threshold and to a high threshold;

means for measuring the pressure on the keyboard;

means for determining a keyboard validation state based on the pressure measurement signals;

means for operating said capacitive measuring means and said selection state means during a first phase of a cycle and for operating said pressure measuring means and validation state means for certain selection status during a second phase of the cycle; and means for determining a valid selection as a function of the selection state and the validation state of the keyboard and generating a valid selection signal to be used by said keyboard.

20. An apparatus according to claim 19 wherein said transition means determines a preselection state for a key when its difference in capacitance is greater than said low threshold and a confirmed selection state for a key if it has already been in a preselection state and its difference in capacitance is greater than the high threshold.

21. An apparatus according to claim 19 wherein said transition means determines a preselection state for a key having the highest difference in capacitance when the difference in capacitance of two keys is greater than the low threshold.

* * * * *